(12) United States Patent
Choi

(10) Patent No.: US 10,897,563 B2
(45) Date of Patent: Jan. 19, 2021

(54) CAMERA MODULE

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 314 days.

(21) Appl. No.: 15/754,976

(22) PCT Filed: Aug. 24, 2016

(86) PCT No.: PCT/KR2016/009348
§ 371 (c)(1),
(2) Date: Feb. 23, 2018

(87) PCT Pub. No.: WO2017/034308
PCT Pub. Date: Mar. 2, 2017

(65) Prior Publication Data
US 2020/0059584 A1  Feb. 20, 2020

(30) Foreign Application Priority Data

Aug. 24, 2015 (KR) .................. 10-2015-0118535

(51) Int. Cl.
*H04N 5/225* (2006.01)
*H04N 5/232* (2006.01)

(52) U.S. Cl.
CPC ......... *H04N 5/2258* (2013.01); *H04N 5/2253* (2013.01); *H04N 5/2254* (2013.01); *H04N 5/23238* (2013.01)

(58) Field of Classification Search
CPC .......................... H04N 5/2254; H04N 5/2258
See application file for complete search history.

(56) References Cited

U.S. PATENT DOCUMENTS 7,974,015 B2 * 7/2011 Toyoda .................. G02B 13/06
359/711
2003/0156414 A1  8/2003 Tenmyo
(Continued)

FOREIGN PATENT DOCUMENTS

CN  102096305 A  6/2011
CN  105867064 A  8/2016
(Continued)

OTHER PUBLICATIONS

Office Action dated Nov. 5, 2019 in Chinese Application No. 201680061673.5.
(Continued)

*Primary Examiner* — Rowina J Cattungal
(74) *Attorney, Agent, or Firm* — Saliwanchik, Lloyd & Eisenschenk

(57) ABSTRACT

A camera module according to one embodiment comprises: a first lens part having an optical axis arranged parallel to an X-axis; a second lens part having an optical axis arranged parallel to a Y-axis perpendicular to the X-axis; a first image sensor having one surface arranged to face the first lens part; a second image sensor having one surface arranged to face the second lens part; and a light guide part arranged between the first lens part and the first image sensor, or between the second lens part and the second image sensor.

16 Claims, 8 Drawing Sheets

(56) References Cited

U.S. PATENT DOCUMENTS

| | | | | |
|---|---|---|---|---|
| 2008/0316609 | A1* | 12/2008 | Robinson | G02B 27/0025 |
| | | | | 359/664 |
| 2009/0195639 | A1* | 8/2009 | Toyoda | H04N 5/23238 |
| | | | | 348/36 |
| 2010/0045773 | A1* | 2/2010 | Ritchey | H04N 5/2259 |
| | | | | 348/36 |
| 2014/0111650 | A1* | 4/2014 | Georgiev | H04N 5/2254 |
| | | | | 348/159 |
| 2014/0247373 | A1* | 9/2014 | Harple | H04N 5/23229 |
| | | | | 348/222.1 |
| 2015/0222816 | A1* | 8/2015 | Shohara | H04N 5/235 |
| | | | | 348/38 |
| 2017/0351104 | A1* | 12/2017 | Revell | H04N 5/2254 |

FOREIGN PATENT DOCUMENTS

| | | |
|---|---|---|
| JP | 2011-505762 A | 2/2011 |
| KR | 10-0614840 B1 | 8/2006 |
| KR | 10-2012-0122398 A | 11/2012 |
| KR | 10-2013-0111789 A | 10/2013 |
| KR | 10-1502448 B1 | 3/2015 |

OTHER PUBLICATIONS

Supplementary European Search Report dated Jul. 20, 2018 in European Application No. 16839597.8.
International Search Report in International Application No. PCT/KR2016/009348, filed Aug. 24, 2016,.

* cited by examiner

CAMERA MODULE

CROSS-REFERENCE TO RELATED APPLICATIONS

This application is the U.S. national stage application of International Patent Application No. PCT/KR2016/009348, filed Aug. 24, 2016, which claims priority to Korean Application No. 10-2015-0118535, filed Aug. 24, 2015, the disclosures of each of which are incorporated herein by reference in their entirety.

TECHNICAL FIELD

Embodiments relate to a camera module that is capable of realizing a wide-angle image while inhibiting or reducing distortion of the image and degradation of the resolution and quality of the image.

BACKGROUND ART

The content described in this section merely provides background information regarding embodiments, and does not constitute the prior art.

Recently, outdoor sports or outdoor activities such as camping, leisure, and extreme sports have become more popular. Therefore, in many cases, these active activities are recorded in the form of photographs or video.

In particular, in order to take excellent photographs or video of a scene of extreme sports or natural scenery, demand for action cameras is increasing. In addition, rather than a common image, demand for panoramic images or photographs, which are taken by a wide-angle camera module having a wide field of view (FOV), is also increasing.

Further, such a wide-angle camera module may be used as a means for immediately recognizing a wide range of the environment surrounding a so-called smart car, which performs a wide and precise scan of the surrounding environment and uses the results of the scan for traveling.

In general, in the case of a camera module that uses a wide-angle lens having a wide field of view, it is possible to realize a field of view of 180° or more using a single lens unit. However, in this case, because a wide-angle image is captured by a single lens unit, the captured image is severely distorted.

This image distortion may cause a user of the camera module to erroneously perceive the distance to an object, the shape of an object, or the like. For example, when this camera module is mounted in a vehicle, a user, i.e. a driver, may erroneously perceive the distance to an external object, the shape of an external object, or the like, which may lead to a traffic accident.

Further, when the distorted image is corrected, the resolution or quality of the image may be degraded in the image correction process. Therefore, improvement is needed.

DISCLOSURE

Technical Problem

Therefore, embodiments relate to a camera module that is capable of realizing a wide-angle image while inhibiting or reducing distortion of the image and degradation of the resolution and quality of the image.

The objects of the embodiments should not be limited to the aforementioned objects, and other unmentioned objects will be clearly understood by those skilled in the art from the following description.

Technical Solution

In one embodiment, there is provided a camera module including: a first lens unit arranged such that an optical axis thereof is parallel to an x-axis; a second lens unit arranged such that an optical axis thereof is parallel to a y-axis, the y-axis being perpendicular to the x-axis; a first image sensor arranged such that one surface thereof faces the first lens unit; a second image sensor arranged such that one surface thereof faces the second lens unit; and a light guide unit arranged between the first lens unit and the first image sensor and between the second lens unit and the second image sensor.

In another embodiment, there is provided a camera module including: a first lens unit arranged such that an optical axis thereof is parallel to an x-axis; a second lens unit arranged such that an optical axis thereof is parallel to a y-axis, the y-axis being perpendicular to the x-axis; a first image sensor arranged such that one surface thereof faces the first lens unit; a second image sensor arranged such that one surface thereof faces the second lens unit; and a hexahedral body formed of a transparent material and arranged between the first lens unit and the first image sensor and between the second lens unit and the second image sensor, wherein light that is incident on the first lens unit passes through the hexahedral body and is incident on the first image sensor, and light that is incident on the second lens unit passes through the hexahedral body and is incident on the second image sensor.

In a further embodiment, there is provided a camera module including: a first lens unit arranged such that an optical axis thereof is parallel to an x-axis; a second lens unit arranged such that an optical axis thereof is parallel to a y-axis, the y-axis being perpendicular to the x-axis; a first image sensor arranged such that one surface thereof faces the first lens unit; a second image sensor arranged such that one surface thereof faces the second lens unit; a first prism on which light that has passed through the first lens unit is incident; and a second prism on which light that has passed through the second lens unit is incident, wherein light that is incident on the first lens unit is reflected by a boundary surface of the first prism that faces the second prism and is incident on the second image sensor, and light that is incident on the second lens unit is reflected by a boundary surface of the second prism that faces the first prism and is incident on the first image sensor.

Advantageous Effects

The camera module according to the embodiments is capable of obtaining a plurality of images using a plurality of lens units each having a relatively narrow field of view and of realizing a single wide-angle image within a wide field of view by combining the plurality of images.

In addition, when the camera module according to the embodiments obtains a wide-angle image, the field of view is relatively narrow. Therefore, image distortion is inhibited, and the resolution or quality of the image is improved.

In the embodiments, since the lenses are formed integrally with the light guide unit, the total length of each lens unit in the optical-axis direction, in which a plurality of lenses is arranged, may be reduced, and accordingly, the camera module according to the embodiments may become smaller.

DESCRIPTION OF DRAWINGS

FIG. 5b illustrates one embodiment.

BEST MODE

Figure 1:
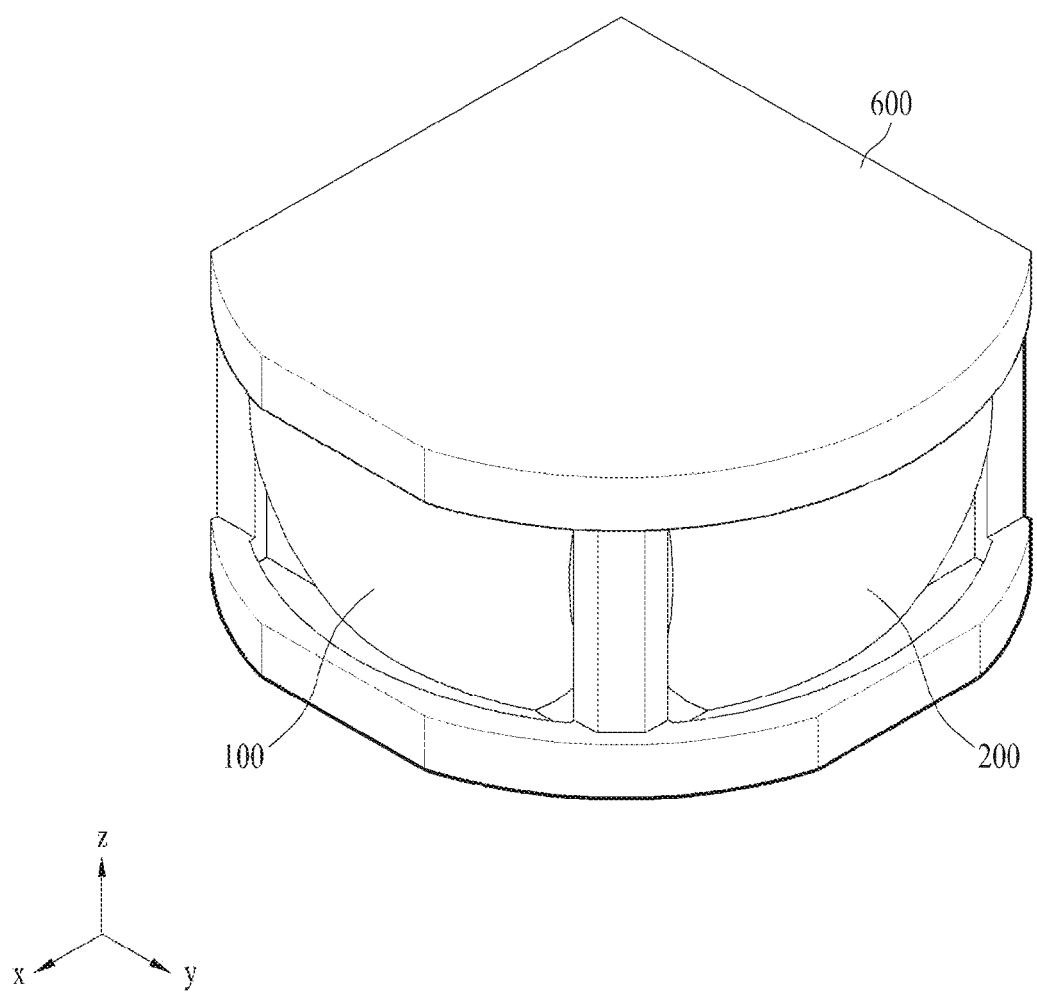
FIGS. 1 and 2 are perspective views illustrating a camera module according to an embodiment.

Hereinafter, embodiments will be described in detail with reference to the accompanying drawings. While the disclosure is susceptible to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for clarity and convenience of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under", "under the element" as well as "on the element" can be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements. In addition, an orthogonal coordinate system (x, y, z) may be used in the drawings.

Figure 2:
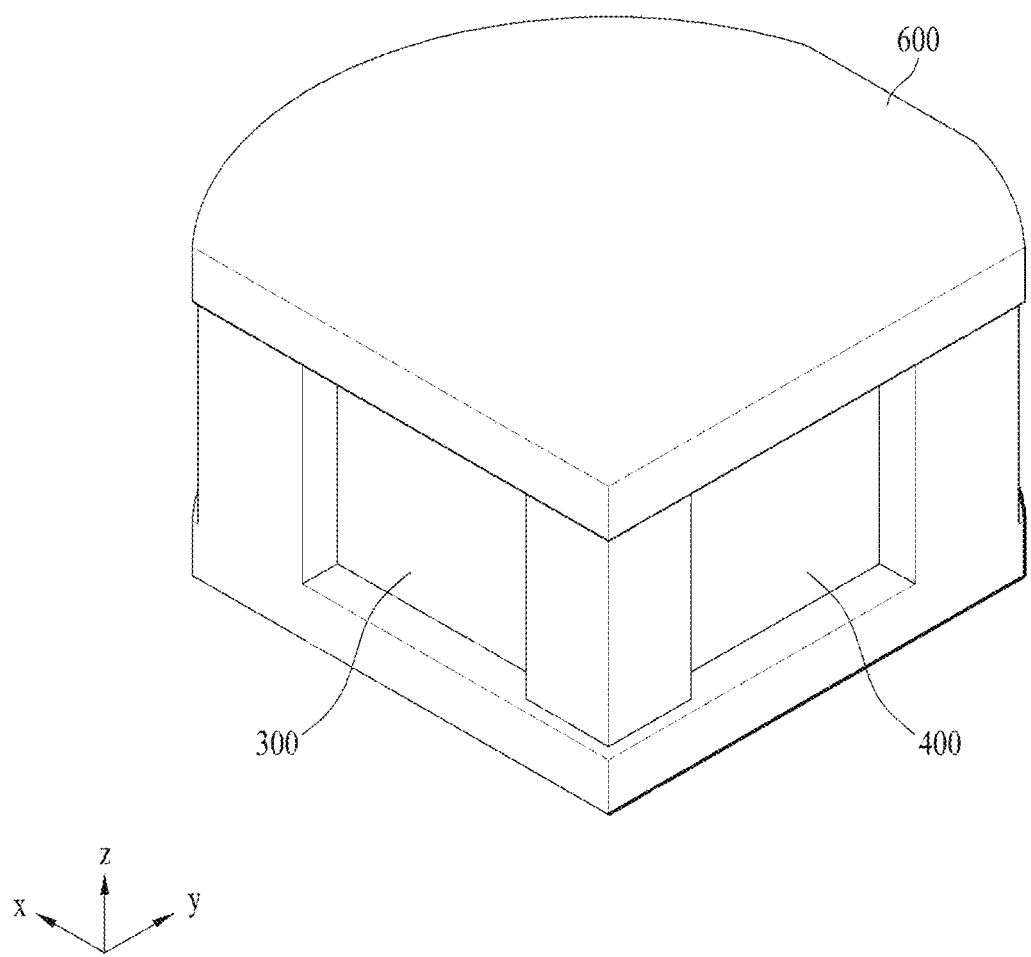
Figure 3:
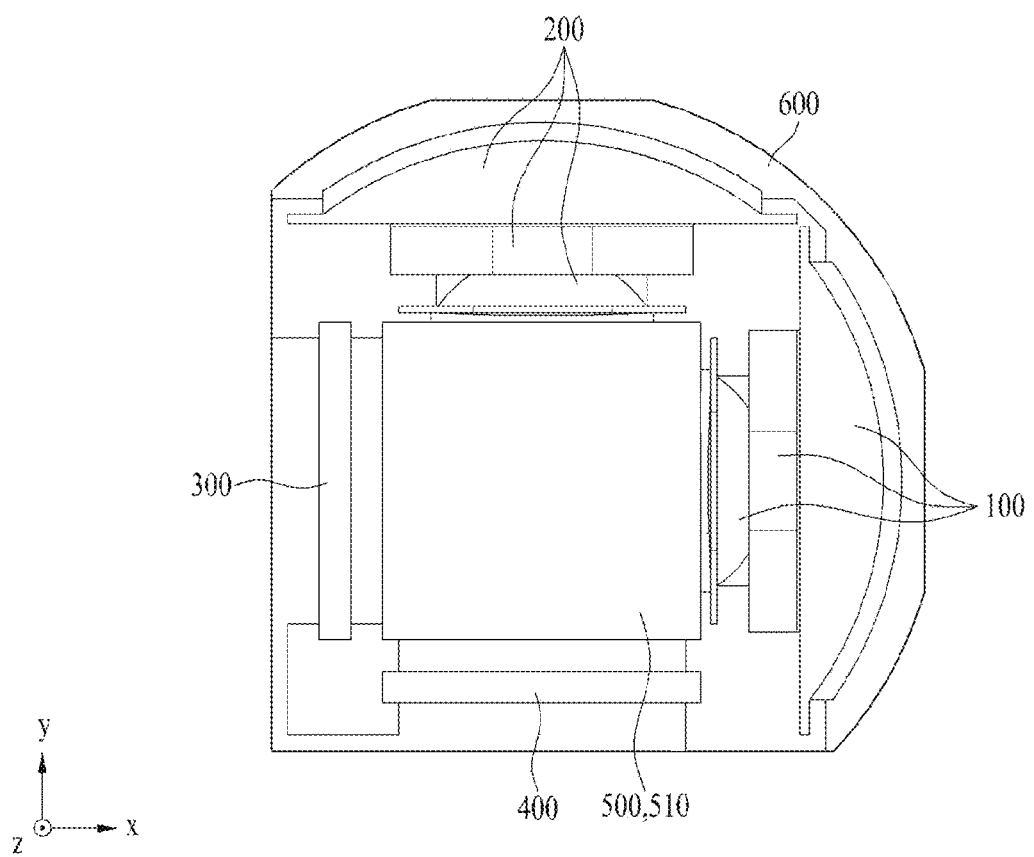
FIG. 3 is a plan view illustrating the configuration of the camera module according to the embodiment, from which an upper portion of a base is removed.

FIGS. 1 and 2 are perspective views illustrating a camera module according to an embodiment. FIG. 3 is a plan view illustrating the configuration of the camera module according to the embodiment, from which an upper portion of a base 600 is removed. The camera module according to the embodiment may include a first lens unit 100, a second lens unit 200, a first image sensor 300, a second image sensor 400, a light guide unit 500, and a base 600.

The base 600 may accommodate the light guide unit 500 therein, and the first lens unit 100, the second lens unit 200, the first image sensor 300 and the second image sensor 400 may be mounted to the base 600. As shown in FIGS. 1 and 2, the base 600 may include an upper member and a lower member, which have, for example, a plate shape, as well as a plurality of connection members for connecting the upper member and the lower member to each other.

Through this configuration of the base 600, a portion of the first lens unit 100 and a portion of the second lens unit 200 may be exposed outside so that external light is incident on the first lens unit 100 and the second lens unit 200, a space for accommodating the light guide unit 500 may be formed, and the first image sensor 300 and the second image sensor 400 may be arranged so as to respectively face the first lens unit 100 and the second lens unit 200 while being spaced a predetermined distance apart from the first lens unit 100 and the second lens unit 200.

The base 600 may be formed such that the upper member, the lower member and the connection members are integrally formed via injection molding or the like, or such that the respective members are individually formed and are coupled to each other via adhesion, welding, or the like.

Further, the configuration of the base 600 may be variously changed, as long as the light guide unit is accommodated in the base 600, the first lens unit 100 and the first image sensor 300 are arranged in the same optical-axis direction on the basis of the light guide unit 500, and the second lens unit 200 and the second image sensor 400 are arranged in the same optical-axis direction on the basis of the light guide unit 500.

The first lens unit 100 may be mounted to the base 600 such that the axis of the incident light, i.e. the optical axis, is parallel to the x-axis. The second lens unit 200 may be mounted to the base 600 such that the optical axis is parallel to the y-axis, which is perpendicular to the x-axis.

In this case, each of the first lens unit 100 and the second lens unit 200 may be embodied by a single lens, or may form an optical system in which a plurality of lenses is arranged in the corresponding optical-axis direction.

As shown in FIG. 3, the embodiment is made such that each of the first lens unit 100 and the second lens unit 200 is embodied by three lenses, which are arranged parallel to each other in the corresponding optical-axis direction. However, the disclosure is not limited thereto, and each of the first lens unit 100 and the second lens unit 200 may be embodied by various other numbers of lenses and various other types of lenses as needed. Further, the number and type of lenses of the first lens unit 100 are not necessarily identical to those of the lenses of the second lens unit 200.

The first image sensor 300 may be arranged such that one surface thereof, i.e. the surface on which an image is formed, faces the first lens unit 100. As shown in FIG. 3, the first image sensor 300 may be arranged so as to face the first lens unit 100, with the light guide unit 500 interposed therebetween.

The second image sensor 400 may be arranged such that one surface thereof faces the second lens unit 200. As shown in FIG. 3, the second image sensor 400 may be arranged so as to face the second lens unit 200, with the light guide unit 500 interposed therebetween.

The first image sensor 300 and the second image sensor 400 are elements, on which the light, having passed through the light guide unit 500, is incident, and in which images captured by the camera module are formed. The images, which are formed in the first image sensor 300 and the second image processor, may be converted into electric signals, and the electric signals may be transmitted to, for example, an image processor (not illustrated).

The image processor may combine a plurality of different images, which are transmitted thereto from the first image sensor 300 and the second image sensor 400, into a single image.

Therefore, the camera module according to the embodiment is capable of realizing a wide-angle image by combining a plurality of images, which are captured in different directions and are obtained via the first image sensor 300 and the second image sensor 400.

The light guide unit 500 may be disposed between the first lens unit 100 and the first image sensor 300 and between the second lens unit 200 and the second image sensor 400, and the light, which is incident on the first lens unit 100 or the second lens unit 200, may pass through the light guide unit 500 and may reach the first image sensor 300 and the second image sensor 400.

The light guide unit 500 may be embodied by a hexahedral body 510 formed of a transparent material. Here, the light guide unit 500 may be embodied by, for example, an integrally formed hexahedral body 510, or may be embodied by a hexahedral body 510 that is formed by coupling of a pair of prisms 520.

A detailed description of the configuration of the light guide unit 500, which is formed by coupling of a pair of prisms 520, will be made later with reference to FIGS. 5a, 5b and 6, and a description of the light guide unit 500, which is embodied by the integrally formed hexahedral body 510, will now be made with reference to FIGS. 3 and 4.

Figure 4:
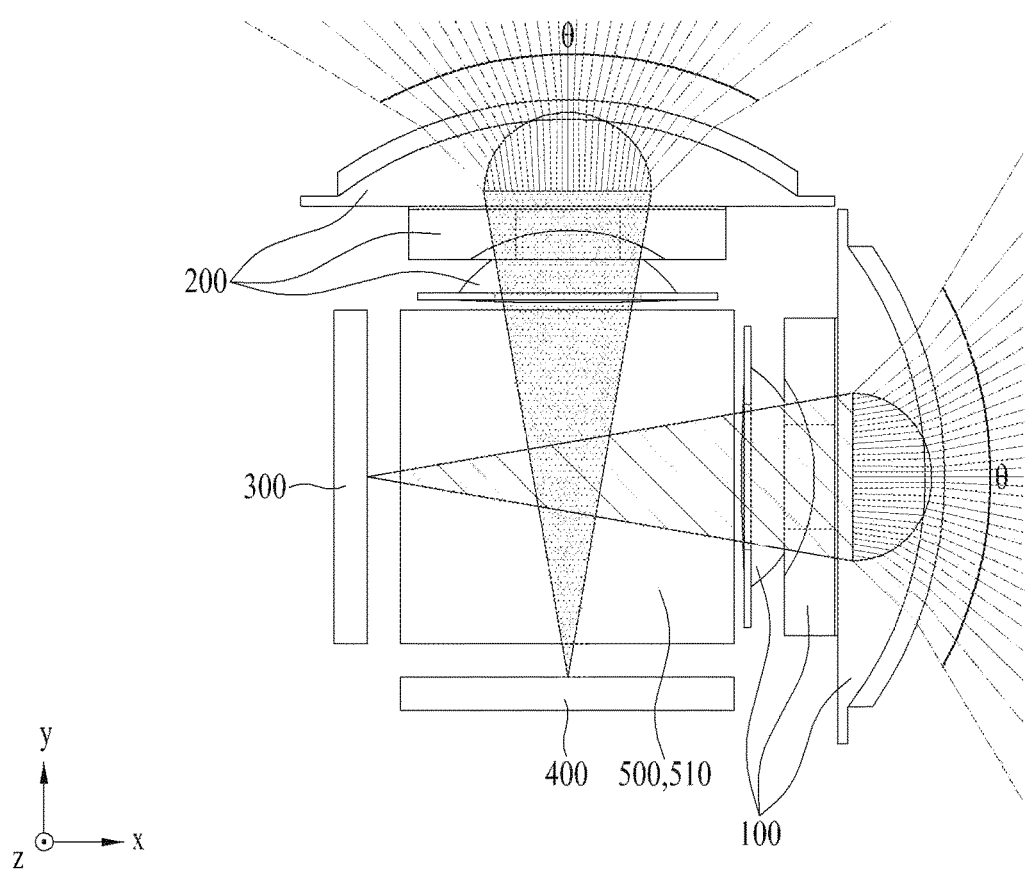
FIG. 4 is a view for explaining the operation of the camera module according to the embodiment.

FIG. 4 is a view for explaining the operation of the camera module according to the embodiment. As shown in FIGS. 3 and 4, the light guide unit 500 may be formed of a transparent material, and may be formed in the shape of a rectangular parallelepiped or a cube, i.e. a regular hexahedron.

The optical axis of the light that is incident on the hexahedral body 510 is identical to the optical axis of the light that escapes from the hexahedral body 510. That is, the optical-axis direction is not changed while the light passes through the hexahedral body 510.

Therefore, as shown in FIG. 4, the light, which is incident on the first lens unit 100, may pass through the hexahedral body 510, and may be incident on the first image sensor 300. Further, the light, which is incident on the second lens unit 200, may pass through the hexahedral body 510, and may be incident on the second image sensor 400.

As described above, a plurality of images, which are captured in different directions and are obtained via the first image sensor 300 and the second image sensor 400, may be combined into a single image.

Further, in the camera module according to the embodiment, the field of view (FOV) θ of each of the first lens unit 100 and the second lens unit 200, i.e. the angle at which each of the first lens unit 100 and the second lens unit 200 captures the image of a subject, may range, for example, from 90° to 110°.

In addition, the total field of view, which is the sum of the field of view θ of the first lens unit 100 and the field of view θ of the second lens unit 200, may range, for example, from 160° to 200°. The total field of view may be smaller than the value that is obtained by arithmetically adding the field of view θ of the first lens unit 100 and the field of view θ of the second lens unit 200. The reason for this is that the field of view θ of the first lens unit 100 and the field of view θ of the second lens unit 200 may overlap each other.

Therefore, in the embodiment, the field of view θ of the first lens unit 100 and the field of view θ of the second lens unit 200 may overlap each other by about 20°. This means that the camera module may capture the same image within a range of about 20°.

Further, in the camera module according to the embodiment, it may be desirable to set the total field of view to about 190° in order to capture the best image.

In general, in the case of a camera module that uses a wide-angle lens having a wide field of view, a single lens unit may be configured to realize a field of view ranging from 160° to 200°, specifically, about 190°.

However, in this case, because a wide-angle image is captured by a single lens unit, the captured image is severely distorted. This image distortion may include barrel distortion, in which the middle portion of the image is bent convexly, and pincushion distortion, in which the middle portion of the image is bent concavely.

This image distortion may cause a user of the camera module to erroneously perceive the distance to an object, the shape of an object, or the like. For example, when this camera module is mounted in a vehicle, a user, i.e. a driver, may erroneously perceive the distance to an external object, the shape of an external object, or the like, which may lead to a traffic accident.

Further, when the distorted image is corrected, the resolution or quality of the image may be degraded in the image correction process.

However, the camera module according to the embodiment is capable of obtaining a plurality of images using a plurality of lens units each having a relatively narrow field of view θ and of realizing a single wide-angle image by combining the plurality of images.

In addition, when the camera module according to the embodiment obtains a wide-angle image, the field of view θ is relatively narrow. Therefore, image distortion is inhibited, and the resolution or quality of the image is improved.

Figure 5A:
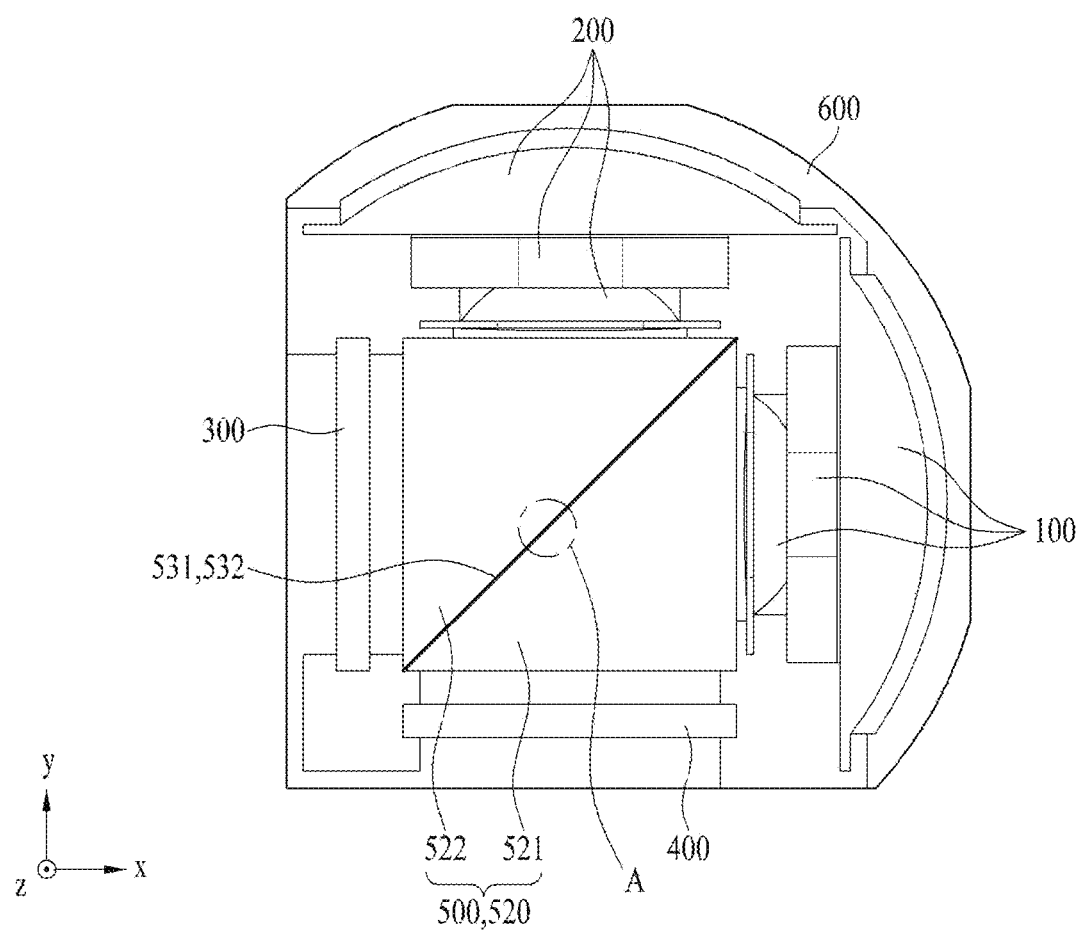
FIG. 5a is a plan view illustrating the configuration of a camera module according to another embodiment, from which the upper portion of the base is removed.

FIG. 5a is a plan view illustrating the configuration of a camera module according to another embodiment, from which an upper portion of the base 600 is removed. FIG. 5b is an enlarged view of portion "A" in FIG. 5a. Here, FIG. 5b illustrates one embodiment. FIG. 6 is a view for explaining the operation of the camera module according to the other embodiment.

In the embodiment, the light guide unit 500 may be formed of a transparent material, and may be embodied by a hexahedral body, which is formed by coupling of a pair of prisms 520 each having a trigonal prism shape. In this case, the hexahedral body may be formed in the shape of a rectangular parallelepiped or a cube.

Each of the pair of prisms 520 may have a right-triangle-shaped cross-section, and the surface formed at the hypotenuse of the right triangle of one prism may be coupled to that of the other prism, thereby forming the hexahedral body. Here, the surface formed at the hypotenuse of the right triangle may be a boundary surface 531 or 532 of each of the pair of prisms 520.

Needless to say, in order to form the hexahedral body via the coupling of the pair of prisms 520, each of the prisms 520 may be formed to have a right-triangle-shaped cross-section.

As shown in FIG. 5a, the pair of prisms 520 may include a first prism 521, on which the light, having passed through the first lens unit 100, is incident, and a second prism 522, on which the light, having passed through the second lens unit 200, is incident.

The first prism 521 and the second prism 522 may be coupled at the boundary surfaces 531 and 532 thereof to each other. That is, the boundary surface 531 of the first prism 521 that faces the second prism 522, i.e. the boundary surface 531 of the first prism 521, and the boundary surface 532 of the second prism 522 that faces the first prism 521, i.e. the boundary surface 532 of the second prism 522, are coupled to each other, thereby forming the hexahedral-shaped light guide unit 500.

In this case, each of the boundary surface 531 of the first prism 521 and the boundary surface 532 of the second prism 522 may serve to reflect the light that is incident on a corresponding one of the first prism 521 and the second prism 522, thereby changing the optical-axis direction of the light that is incident through the first lens unit 100 or the second lens unit 200.

The light incident on the first prism 521 may be reflected by the boundary surface 531 of the first prism 521, and the optical path and the optical-axis direction of the light may be changed. The light incident on the second prism 522 may be reflected by the boundary surface 532 of the second prism 522, and the optical path and the optical-axis direction of the light may be changed.

At this time, the reflection of light, which occurs at each of the boundary surfaces 531 and 532, may be total reflection, and a reflective layer 540 may be formed adjacent to each of the boundary surfaces 531 and 532 in order to enhance reflectivity.

When each of the boundary surfaces 531 and 532 is configured to realize total reflection of light, the reflective layer 540 may not be formed. However, the formation of the reflective layer 540 may enhance light reflectivity.

Figure 5B:
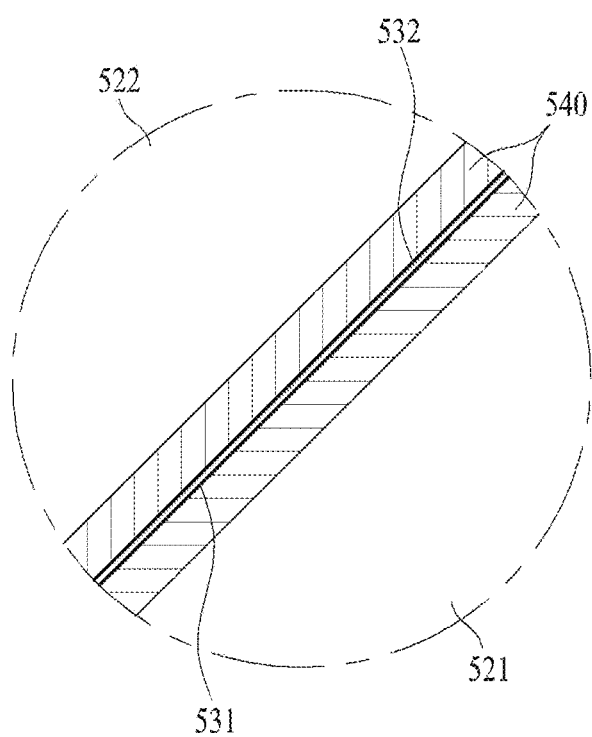
FIG. 5b is an enlarged view of portion "A" in FIG. 5a. Here.

FIG. 5b illustrates the configuration of the reflective layers 540, which are formed adjacent to the boundary surfaces 531 and 532 of the first prism 521 and the second prism 522. As shown in FIG. 5b, the first prism 521 and the second prism 522 may include the reflective layers 540, which are formed adjacent to the boundary surfaces 531 and 532 thereof.

Specifically, a reflective layer 540 having a predetermined thickness may be formed at the boundary surface 531 of the first prism 521. In the same manner, a reflective layer 540 having a predetermined thickness may be formed at the boundary surface 532 of the second prism 522.

The reflective layers 540 may face each other. Each of the reflective layers 540 may serve to reflect the light that is incident on a corresponding one of the first prism 521 and the second prism 522, thereby changing the optical path and the optical-axis direction of the light.

The reflective layers 540 may be formed of any material, as long as the material is opaque and has high light reflection efficiency. In addition, the reflective layers 540 may be formed in a film configuration and may be attached to the boundary surfaces 531 and 532, or may be formed by coating a reflective material onto the boundary surfaces 531 and 532.

Figure 6:
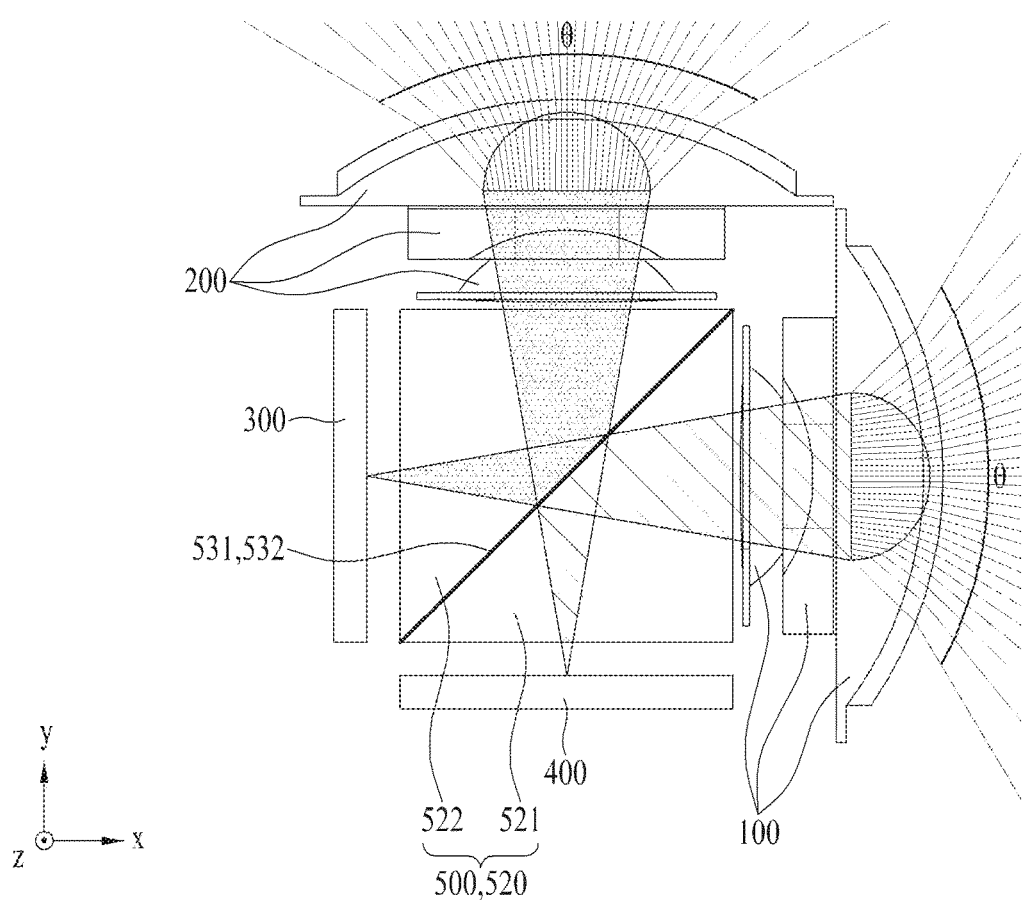
FIG. 6 is a view for explaining the operation of the camera module according to the other embodiment.

FIG. 6 is a view for explaining the operation of the camera module illustrated in FIGS. 5a and 5b. As described above, in the camera module according to the embodiment, the optical path of the light that is incident on each of the first lens unit 100 and the second lens unit 200 may be changed, and accordingly, the optical-axis direction may also be changed.

That is, as shown in FIG. 6, the light that is incident on the first lens unit 100 may be reflected by the boundary surface 531 of the first prism 521 that faces the second prism 522, i.e. the boundary surface 531 of the first prism 521, and may be incident on the second image sensor 400.

In addition, the light that is incident on the second lens unit 200 may be reflected by the boundary surface 532 of the second prism 522 that faces the first prism 521, i.e. the boundary surface 532 of the second prism 522, and may be incident on the first image sensor 300.

Compared with the embodiment illustrated in FIG. 4, in the embodiment illustrated in FIG. 6, the lens unit, on which the light is incident, and the image sensor, at which the light arrives, are changed. However, the plurality of images obtained in the embodiment illustrated in FIG. 4 and the plurality of images obtained in the embodiment illustrated in FIG. 6 are the same as each other.

As described above, a plurality of images, which are captured in different directions and are obtained via the first image sensor 300 and the second image sensor 400, may be combined into a single image.

Further, in the same manner as described with reference to FIG. 4, in the camera module according to the embodiment illustrated in FIG. 6, the field of view θ of each of the first lens unit 100 and the second lens unit 200 may range, for example, from 90° to 110°.

In addition, the total field of view, which is the sum of the field of view θ of the first lens unit 100 and the field of view θ of the second lens unit 200, may range, for example, from 160° to 200°. As described above, the total field of view may be smaller than the value that is obtained by arithmetically adding the field of view θ of the first lens unit 100 and the field of view θ of the second lens unit 200. The reason for this is that the field of view θ of the first lens unit 100 and the field of view θ of the second lens unit 200 may overlap each other.

Therefore, in the embodiment, the field of view θ of the first lens unit 100 and the field of view θ of the second lens unit 200 may overlap each other by about 20°. This means that the camera module may capture the same image within a range of about 20°.

Further, in the camera module according to the embodiment, it may be desirable to set the total field of view to about 190° in order to capture the best image.

Figure 7:
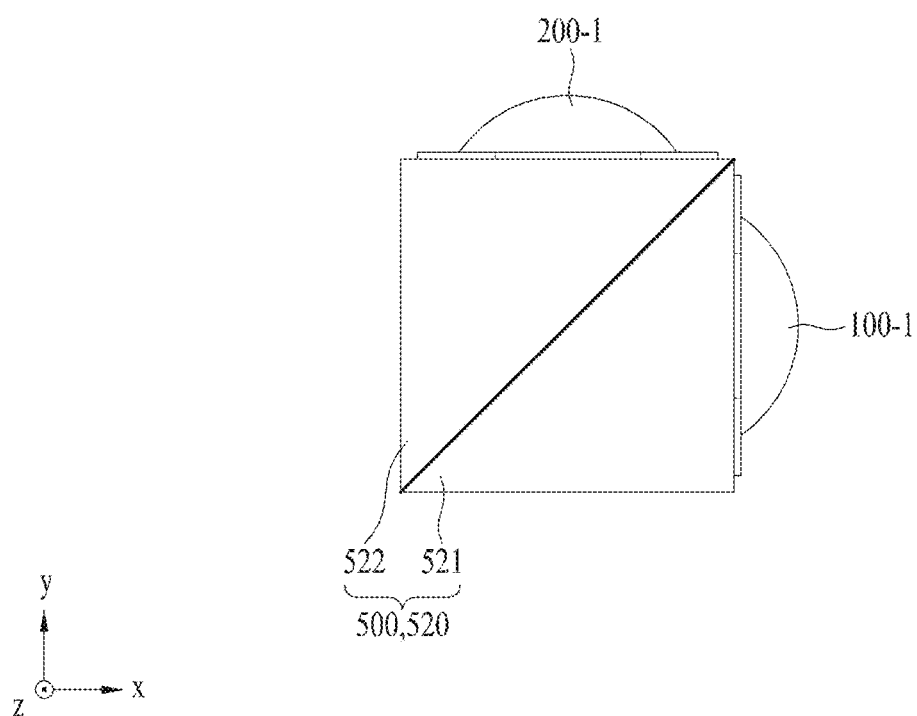
FIG. 7 is a view for explaining the configuration of lens units according to another embodiment in the camera module.

FIG. 7 is a view for explaining the configuration of the lens units according to another embodiment in the camera module. In the embodiment, at least one of the plurality of lenses, which constitute the first lens unit 100 and the second lens unit 200, may be formed integrally with the light guide unit 500 at the surface of the light guide unit 500.

For example, as shown in FIG. 7, one lens 100-1, which constitutes the first lens unit 100, and another lens 200-1, which constitutes the second lens unit 200, may be formed integrally with the light guide unit 500 at the surface of the light guide unit 500.

The lenses 100-1 and 200-1 may be formed integrally with the light guide unit 500 via injection molding, or may be fixedly coupled to the light guide unit 500 via adhesion or welding.

Further, although the light guide unit 500 illustrated in FIG. 7 is formed by coupling of a pair of prisms 520, the above-described configuration may also be applied to the light guide unit 500 illustrated in FIGS. 3 and 4, which is embodied by the integrally formed hexahedral body 510.

In the embodiment, since the lenses 100-1 and 200-1 are formed integrally with the light guide unit 500, the total length of each lens unit in the optical-axis direction, in which a plurality of lenses is arranged, may be reduced, and accordingly, the camera module according to the embodiment may become smaller.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

The camera module according to the embodiments is capable of obtaining a plurality of images using a plurality of lens units each having a relatively narrow field of view and of realizing a single wide-angle image within a wide field of view by combining the plurality of images. Therefore, the embodiments have industrial applicability.

The invention claimed is:

1. A camera module comprising:
a first lens unit arranged such that an optical axis thereof is in parallel to an x-axis;
a second lens unit arranged such that an optical axis thereof is in, parallel to a y-axis, the y-axis being perpendicular to the x-axis;
a first image sensor arranged such that one surface thereof faces the first lens unit;
a second image sensor arranged such that one surface thereof faces the second lens unit; and
a light guide unit arranged between the first lens unit and the first image sensor and between the second lens unit and the second image sensor;
wherein the first lens unit and the second lens unit are configured to have respective optical axes perpendicular to each other and to each have a field of view in a range between 90° and 110° such that a total field of view of the first lens unit and the second lens unit ranges from 160° to 200°.

2. The camera module according to claim 1, wherein each of the first lens unit and the second lens unit comprises a plurality of lenses arranged in an optical-axis direction.

3. The camera module according to claim 2, wherein at least one of the plurality of lenses, is formed integrally with the light guide unit at a surface of the light guide unit.

4. The camera module according to claim 1, wherein the light guide unit is formed as a hexahedral body, the hexahedral body being formed of a transparent material.

5. The camera module according to claim 4, wherein light that is incident on the first lens unit passes through the hexahedral body and is incident on the first image sensor, and
light that is incident on the second lens unit passes through the hexahedral body and is incident on the second image sensor.

6. The camera module according to claim 1, wherein the light guide unit is formed as a hexahedral body, the hexahedral body being formed of a transparent material and being formed by coupling of a pair of prisms each having a trigonal prism shape.

7. The camera module according to claim 6, wherein the pair of prisms comprises:
a first prism on which light that has passed through the first lens unit is incident; and
a second prism on which light that has passed through the second lens unit is incident.

8. The camera module according to claim 7, wherein the light that is incident on the first lens unit is reflected by a boundary surface of the first prism that faces the second prism, and is incident on the second image sensor, and the light that is incident on the second lens unit is reflected by a boundary surface of the second prism that faces the first prism, and is incident on the first image sensor.

9. The camera module according to claim 8, wherein each of the first prism and the second prism comprises a reflective layer formed adjacent to the boundary surface thereof.

10. The camera module according to claim 6, wherein the pair of prisms have right-triangle-shaped cross-sections, and surfaces formed at hypotenuses of right triangles are coupled to each other in order to form the hexahedral body.

11. The camera module according to claim 1, comprising:
a base configured to accommodate the light guide unit therein,
wherein the first lens unit, the second lens unit, the first image sensor, and the second image sensor are mounted to the base.

12. A camera module comprising:
a first lens unit arranged such that an optical axis thereof is in parallel to an x-axis;
a second lens unit arranged such that an optical axis thereof is in parallel to a y-axis, the y-axis being perpendicular to the x-axis;
a first image sensor arranged such that one surface thereof faces the first lens unit;
a second image sensor arranged such that one surface thereof faces the second lens unit; and
a hexahedral body formed of a transparent material and arranged between the first lens unit and the first image sensor and between the second lens unit and the second image sensor,
wherein light that is incident on the first lens unit passes through the hexahedral body and is incident on the first image sensor, and light that is incident on the second lens unit passes through the hexahedral body and is incident on the second image sensor, and
wherein the first lens unit and the second lens unit are configured to have respective optical axes perpendicular to each other and to each have a field of view in a range between 90° and 110° such that a total field of view of the first lens unit and the second lens unit ranges from 160° to 200°.

13. The camera module according to claim 12, wherein each of the first lens unit and the second lens unit comprises a plurality of lenses arranged in an optical-axis direction.

14. The camera module according to claim 12, comprising:
a base configured to accommodate the hexahedral body therein,
wherein the first lens unit, the second lens unit, the first image sensor, and the second image sensor are mounted to the base.

15. A camera module comprising:
a first lens unit arranged such that an optical axis thereof is in parallel to an x-axis;
a second lens unit arranged such that an optical axis thereof is in parallel to a y-axis, the y-axis being perpendicular to the x-axis;
a first image sensor arranged such that one surface thereof faces the first lens unit;
a second image sensor arranged such that one surface thereof faces the second lens unit;
a first prism on which light that has passed through the first lens unit is incident; and
a second prism on which light that has passed through the second lens unit is incident,
wherein light that is incident on the first lens unit is reflected by a boundary surface of the first prism that faces the second prism and is incident on the second image sensor, and light that is incident on the second lens unit is reflected by a boundary surface of the second prism that faces the first prism and is incident on the first image sensor, and wherein the first lens unit and the second lens unit are configured to have respective optical axes perpendicular to each other and to each have a field of view in a range between 90° and 110° and such that a total field of view of the first lens unit and the second lens unit ranges from 160° to 200°.

16. The camera module according to claim 15, wherein each of the first lens unit and the second lens unit comprises a plurality of lenses arranged in an optical-axis direction.

* * * * *